Oct. 10, 1967     P. F. FUHRMEISTER ETAL     3,346,724
RANDOM FUNCTION TRACER
Filed July 15, 1964     2 Sheets-Sheet 1

INVENTORS
PAUL F. FUHRMEISTER
MILNER H. ESKEW, JR.

BY

William H. King
ATTORNEYS

Oct. 10, 1967  P. F. FUHRMEISTER ETAL  3,346,724
RANDOM FUNCTION TRACER
Filed July 15, 1964  2 Sheets-Sheet 2

INVENTORS
PAUL F. FUHRMEISTER
MILNER H. ESKEW, JR.

BY

William H. King
ATTORNEYS

United States Patent Office 3,346,724
Patented Oct. 10, 1967

3,346,724
RANDOM FUNCTION TRACER
Paul F. Fuhrmeister, Williamsburg, and Milner H. Eskew, Jr., Hampton, Va., assignors to the United States of America as represented by the Administrator of the National Aeronautics and Space Administration
Filed July 15, 1964, Ser. No. 382,976
8 Claims. (Cl. 235—61.6)

The invention described herein may be manufactured and used by or for the Government of the United States of America for governmental purposes without the payment of any royalties thereon or therefor.

The invention relates generally to a random function tracer and more particularly concerns a device for obtaining in digital form the Cartesian coordinates of points on contour maps.

The only method known by the inventors, at the time this invention was made, of obtaining Cartesian coordinates from contour maps was a method used with a standard film reading device. This method is laborious and time-consuming. The present invention provides a random function tracer which utilizes a fast and simple method of obtaining Cartesian coordinates from contour maps. The tracer consists essentially of a tracing device, a digitizing and recording system, and a computer. The tracing device is similar to a standard drafting machine. It consists of a first arm with one of its end rotatably mounted on a table; a second arm with one of its ends rotatably attached to the other end of the first arm; a stylus attached to the free end of the second arm; a first potentiometer attached to the table and to the first arm to vary in accordance with the angle sweep of the first arm; and a second potentiometer attached to the first and second arms to vary in accordance with the angle of sweep of the second arm. The potentiometers are connected across a voltage source so that their outputs are voltages that are proportional to the angles of sweep of the two arms. The voltage outputs of the two potentiometers are applied to the digitizing and recording system which converts the voltages to digital form and then records them. The recordings are then applied to a computer which converts the recordings to Cartesian coordinates.

It is therefore an object of this invention to provide a device for converting points on maps into Cartesian coordinates.

Another object of this invention is to provide a device for tracing lines on a map and for converting these tracings into Cartesian coordinates.

A further object of this invention is to provide a tracing device that is more flexible than previous tracing devices.

A still further object of this invention is to provide a tracing device that utilizes certain features of a standard drafting machine.

Other objects and advantages of this invention will further become apparent hereinafter and in the drawings, in which.

Figure 1:
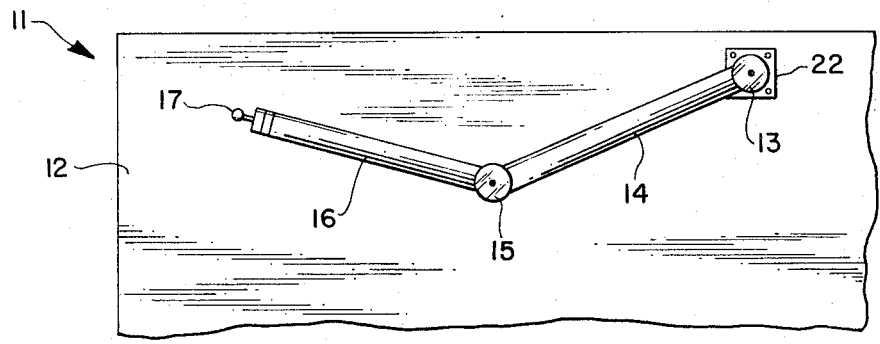
FIG. 1 is a plan view of the tracking device used by this invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 2:
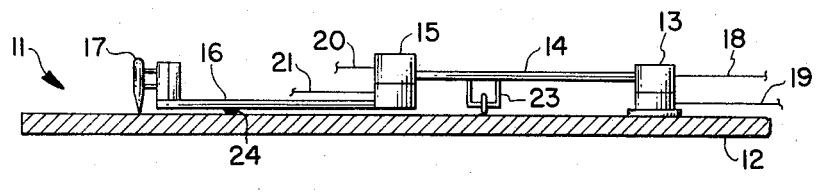
FIG. 2 is a side view of the tracing device shown in FIG. 1.

Turning now to the specific embodiment of the invention selected for illustration in the drawings, the number 11 in FIGS. 1 and 2 designates generally the tracing device of this invention. Tracing device 11 consists essentially of a drafting table 12, a potentiometer 13, an arm 14, a potentiometer 15, an arm 16 and a stylus 17. Potentiometers 13 and 15 are high-precision single-turn potentiometers. In addition to producing outputs proportional to the angles through which the potentiometers are turned, potentiometers 13 and 15 also provide the pivot bearings for the tracer. Potentiometers 13 and 15 each consists of two sections that are rotatable with respect to each other. The output of each potentiometer is proportional to the angle that one of its sections has been rotated with respect to its other section. Potentiometers 13 and 15 are connected in an electrical circuit shown in FIG. 3. The electrical output of potentiometer 13 is across wires 18 and 19, and the electrical output of potentiometer 15 is across wires 20 and 21.

The lower section of potentiometer 13 is attached to table 12 by any suitable means 22. Arm 14 is attached betwen the upper section of potentiometer 13 and the upper section of potentiometer 15 and is supported by a roller support 23. Arm 16 has one of its ends attached to the lower section of potentiometer 15 with a stylus 17 attached to its other end. The free end of arm 16 is slidably supported by a support 24.

Arms 14 and 16 are each twenty-four inches long; however, they can be any length without departing from the scope of this invention. In operation potentiometer 15 is free to move and describe a first arc about potentiometer 13, and stylus 17 is free to move and describe a second arc about potentiometer 15. As stylus 17 traces lines on any map placed on table 12, potentiometer 13 produces across wires 18 and 19 a voltage output directly proportional to the angle between arm 14 and the back of table 12, and potentiometer 15 produces across wires 20 and 21 a voltage output directly proportional to the angle between arm 14 and arm 16. These two voltage outputs are used to calculate the Cartesian coordinates of points on the lines traced by stylus 17.

Figure 3:
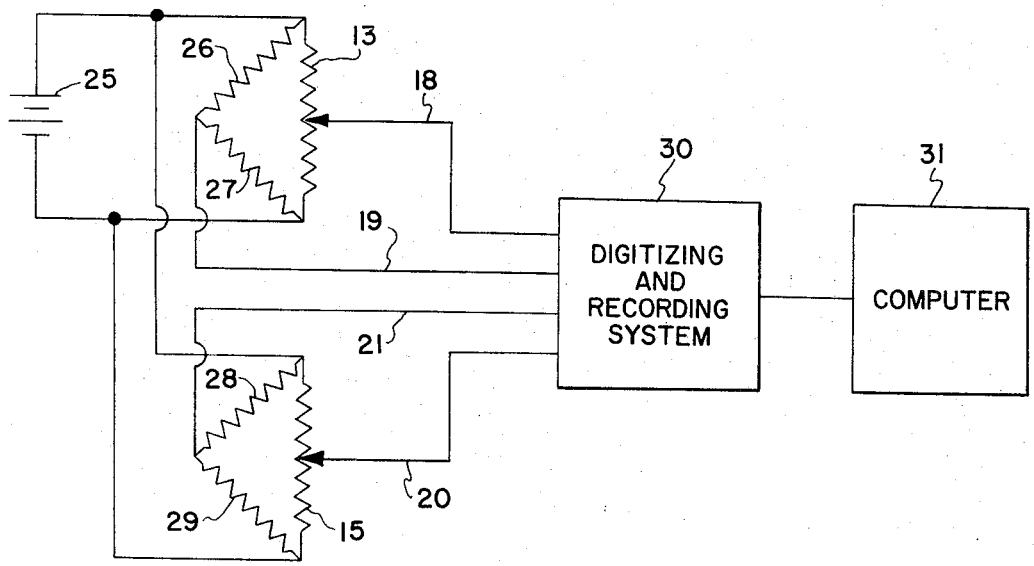
FIG. 3 is a schematic and block diagram of the electrical components of this invention.

Referring now to FIG. 3 there is shown the electrical components of this invention. Potentiometers 13 and 15 are connected across a DC voltage source 25. Two equal resistors 26 and 27 are connected in series across potentiometer 13, and two equal resistors 28 and 29 are connected in series across potentiometer 15. The slider of potentiometer 13 is connected through wire 18 to a digitizing and recording system 30, and the junction of resistors 26 and 27 is connected through wire 19 to recorder 30. Recorder 30 is a digitizing and recording system, such as the Beckman 210 digitizing and recording system, which provides outputs in the form of digital magnetic tape. Consequently, the voltage between wires 18 and 19 is converted to digital readings on magnetic tape by recorder 30. The slider of potentiometer 15 is connected through wire 20 to recorder 30, and the junction of resistors 28 and 29 is connected through wire 21 to recorder 30. The voltage between wires 20 and 21 is converted to digital readings on magnetic tape by recorder 30. The purpose of resistors 26–29 is to enable the sliders of potentiometers 13 and 15 to produce negative as well as positive voltage outputs.

The digital magnetic tape produced by recorder 30 is applied to a computer 31 where the Cartesian coordinates are computed. Computer 31 can be a general purpose computer such as the IBM 7070 or it can be a computer designed for this specific application.

Figure 4:
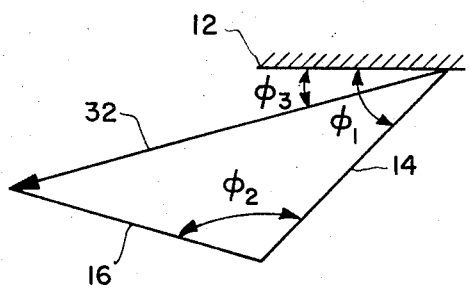
FIG. 4 is a diagram used for the purpose of explaining how Cartesian coordinates are calculated from the outputs of the potentiometers in FIG. 1.

Since the digital magnetic tape produced by recorder 30 contains data of angular measurements, geometric conversion are performed in computer 31 to convert angles to X–Y coordinates. The manner in which these conversions are made can best be understood by referring to the diagram in FIG. 4. The arm 14 makes an angle $\phi_1$ with the back of table 12 and arm 16 makes an angle $\phi_2$ with arm 14. The vector sum of arms 14 and 16 is a vector 32. The angle between vector 32 and the back of table 12 is $\phi_3$. From the law of cosines:

$$C = (A^2 + B^2 - AB \cos \phi_2)^{1/2}$$

Where A is the length of arm 14, B is the length of arm 16, and C is the length of vector 32. The components of vector 32 relative to table 12 may be calculated as follows:

$$X = C \cos \left( \phi_1 - \frac{180° - \phi_2}{2} \right)$$

$$Y = C \sin \left( \phi_1 - \frac{180° - \phi_2}{2} \right)$$

The X–Y coordinates thus obtained may be normalized to a map's origin by subtracting the calculated X–Y coordinates of the origin from the calculated coordinates of all other locations.

Figure 5:
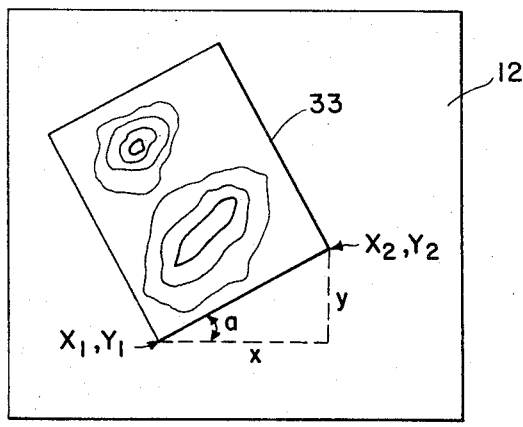
FIG. 5 is a diagram used for the purpose of explaining how an axis rotation may be performed in the computing operation.

To eliminate the necessity of accurately aligning a map 33, in FIG. 5, horizontally with respect to table 12, an axis rotation may be performed by preceding the actual tracing operation with two recorded points on the base line of map 33. Assuming that the coordinates of these two points are $X_1, Y_1$, and $X_2, Y_2$, then the angle alignment error "a" of map 33 with respect to table 12 is:

$$a = \tan^{-1} \frac{Y_2 - Y_1}{X_2 - X_1}$$

The components of vector 32 relative to table 12 calculated above may be corrected by applying the alignment error "a" to previously derived equations for X and Y as shown below:

$$X = C \cos \left( \phi_1 - \frac{180° - \phi_2}{2} - a \right)$$

$$Y = C \sin \left( \phi_1 - \frac{180° - \phi_2}{2} - a \right)$$

Thus all points on a tracing result in true X–Y coordinates with respect to the map origin and base line.

The operation of the invention will now be described while referring to FIGS. 1–3. A map that is to be traced is aligned and attached to the top surface of table 12. Then the operator takes stylus 17 and traces the lines on the map. As these lines are traced potentiometers 13 and 15 vary causing the voltages produced between wires 18 and 19, and between wires 20 and 21 to vary. These voltages are applied to recorder 30 where they are converted into readings on digital magnetic tape. This tape is then applied to computer 31 which computes the Cartesian coordinates of points on the lines traced by stylus 17.

The primary advantage of this random function tracer is the ease with which an operator can trace lines on a map. It is possible to have a tracer whose stylus is free to move in either of two mutually perpendicular directions. However, such a tracer would not be nearly as flexible as the tracer used in this invention.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Random function tracers constructed in accordance with this invention may use synchros or shaft encoders to replace the potentiometers for better precision and reliability. Also the recording step done by recorder 30 could be eliminated by connecting digital shaft encoders directly to the computer.

What is claimed is:

1. A random function tracer for tracing lines on a map and converting the tracings into Cartesian coordinates comprising: a table with said map on the surface of the table; a first arm with one of its ends rotatably mounted to said table; a second arm with one of its ends rotatably attached to the other end of said first arm; means attached to the other end of said second arm for tracing lines on said map; means for producing a first voltage proportional to the angle of rotation of said first arm; means for producing a second voltage proportional to the angle of rotation of said second arm; and means for computing from said first and second voltages the Cartesian coordinates of points on the lines traced by said tracing means.

2. A random function tracer in accordance with claim 1 wherein said means for producing a first voltage includes a first potentiometer attached to said table and to said one end of said first arm such that the slider of said first potentiometer varies as said first arm rotates on said table.

3. A random function tracer in accordance with claim 1 wherein said means for producing a second voltage includes a second potentiometer attached to said other end of said first arm and to said one end of said second arm such that the slider of said second potentiometer varies as said second arm rotates about the said other end of said first arm.

4. A random function tracer for tracing lines on a map and converting the tracings into Cartesian coordinates comprising: a table with said map on the surface of the table; a first arm with one of its ends rotatable mounted to said table; a second arm with one of its ends rotatably attached to the other end of said first arm; means attached to the other end of said second arm for tracing lines on said map; means for producing a first voltage proportional to the angle of rotation of said first arm; means for producing a second voltage proportional to the angle of rotation of said second arm; means for digitizing and recording said first and second voltages and digital computing means for computing Cartesian coordinates from said recording.

5. A random function tracer for tracing lines and converting the tracings into Cartesian coordinates comprising: a table; a first arm with one of its ends rotatably mounted to said table; a second arm with one of its ends rotatably attached to the other end of said first arm; means attached to the other end of said second arm for tracing lines on maps or drawings placed on said table; means for producing a first voltage proportional to the angle of rotation of said first arm from a first reference point; means for producing a second voltage proportional to the angle of rotation of said second arm from a second reference point; and means connected to receive said first and second voltages for computing Cartesian coordinates whereby said computing means produces the Cartesian coordinates of points on the lines traced by said tracing means.

6. A random function tracer for tracing lines and producing electrical outputs indicative of the lines traced comprising: a table; a first arm with one of its ends rotatably mounted to said table; a second arm with one of its ends rotatably attached to the other end of said first arm; means attached to the other end of said second arm for tracing lines on maps or drawings placed on said table; means for producing a first electrical output proportional to the angle of rotation of said first arm; and means for producing an electrical output proportional to the angle of rotation of said second arm whereby said first and second electrical outputs are indicative of the lines traced by said tracing means.

7. A random function tracer in accordance with claim 6 wherein said means for producing a first electrical output includes a first potentiometer attached to said table and to said one end of said first arm such that the slider of said first potentiometer varies as said first arm rotates on said table.

8. A random function tracer in accordance with claim 6 wherein said means for producing a second electrical output includes a second potentiometer attached to said other end of said first arm and to said one end of said second arm such that the slider of said second potentiometer varies as said second arm rotates about the said other end of said first arm.

References Cited
UNITED STATES PATENTS

| | | | |
|---|---|---|---|
| 2,889,627 | 6/1959 | Culpepper et al. | 178—18 X |
| 2,989,238 | 6/1961 | Ford | 235—184 |
| 3,126,541 | 3/1964 | Korn et al. | 178—18 X |

MALCOLM A. MORRISON, *Primary Examiner.*

T. J. PAINTER, *Assistant Examiner.*